UNITED STATES PATENT OFFICE.

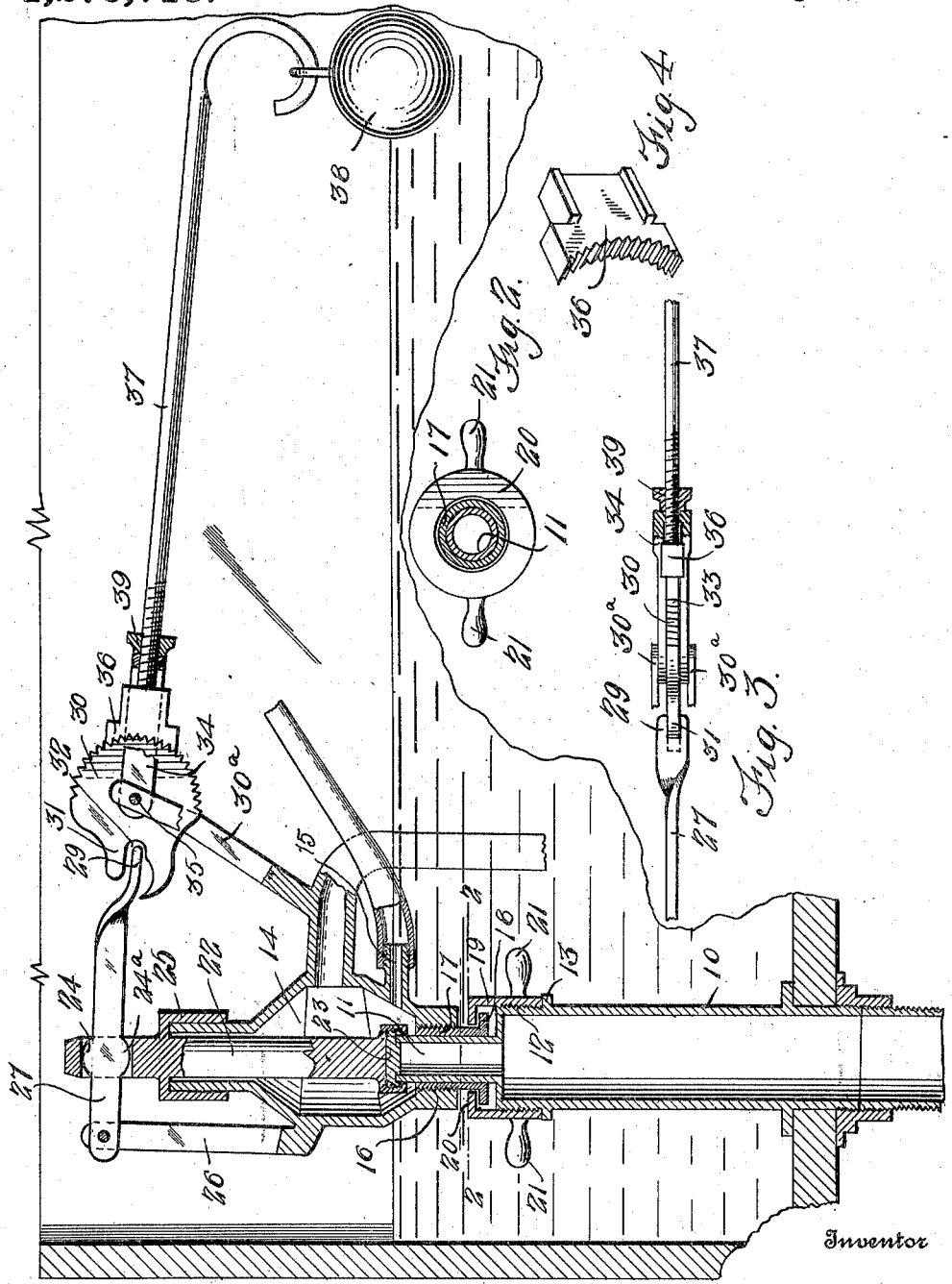

CHARLES T. MILLER, OF MACON, GEORGIA.

WATER-SUPPLY VALVE.

1,275,718.   Specification of Letters Patent.   Patented Aug. 13, 1918.

Application filed April 16, 1917. Serial No. 162,467.

*To all whom it may concern:*

Be it known that I, CHARLES T. MILLER, a citizen of the United States, residing at Macon, in the county of Bibb and State of Georgia, have invented certain new and useful Improvements in Water-Supply Valves, of which the following is a specification, reference being had to the accompanying drawings.

This invention relates to valves for supplying water to tanks and while the invention is particularly designed for flush valves in closet tanks, it is not necessarily limited to this use.

One object of this invention is to provide a valve of the character stated in which the valve casing is rotatable relative to the supply tank or stand pipe upon which the valve is mounted, this connection being such that the valve casing is swiveled on the supply pipe so that a rotation of the supply pipe will not rotate the valve casing or vice versa.

Other objects will appear in the course of the following description.

This invention is illustrated in the following figures, in which:

Figure 1 is a vertical sectional view of a valve constructed in accordance with my invention and showing the valve in position in a flush tank;

Fig. 2 is a sectional view on the line 2—2 of Fig. 1;

Fig. 3 is a fragmentary top plan view of the lever 27, the members 30, 34 and 37; and Fig. 4 is a perspective view of the detent 36.

Referring to the drawings, 10 designates a section of the stand pipe or supply pipe which may be of any suitable character and which is, of course, intended to be connected to other sections of pipe whereby water may be supplied to the section 10. At its upper end this pipe 10 has a reduced portion 11 and below this reduced portion the pipe 10 is screw-threaded as at 12. Below these screw-threads there is formed an outwardly projecting shoulder 13.

Disposed above the pipe section 10 is a valve casing 14 having an outlet pipe and a relatively small outlet nozzle 15 connected to the usual refill pipe. This casing 14 is open at its opposite ends and at its lower end is interiorly screw-threaded as at 16. Immediately surrounding the reduced portion of the pipe section 10 is a sleeve 17, whose upper end is screw-threaded for engagement with the screw thread 16, this sleeve projecting below the lower end of the casing 14 and being formed at its lower end with an annular flange 18. Coupling the pipe section 10 to the sleeve 17 and thus coupling the pipe section 10 to the casing 14, is a collar 19 constituting a nut and whose lower end has screw threaded engagement with the screw threads on the exterior face of the pipe section 10, this collar 19 at its upper end being formed with a flange 20, which extends over the outwardly projecting or annular flange 18. A swiveled engagement is thus provided between the collar 19 and the collar 17 and thus between the pipe section 10 and the casing, so that the casing 14 may rotate freely with relation to the pipe section 10. It will, of course, be understood that these parts are all so closely engaged with each other that water cannot leak through the joint, but that the head can freely rotate or swivel upon the pipe 10. It is to be noted that the shoulder 13 strikes the collar 19 before this collar will bind upon the lower end of the sleeve 17. The collar 19 is to be provided with the radially projected handles 21, whereby the collar may be readily applied to the screw threads 12 and this coupling collar 19 rotated so as to draw the pipe section 10 up into proper engagement with the casing and allied parts.

It will be noted from Fig. 1 that the flange 13 prevents the coupling collar 19 from having binding engagement with the flange 18 on the sleeve 17. Normally there is a space of about $\frac{1}{16}''$ more or less between the flange 18 and the confronting face of the pipe section and it is to be understood that the casing 14 is at all times freely rotatable with relation to the pipe section 10, so that any rotation of the pipe section 10 will not act to rotate the casing 14 or allied parts, if there is the slightest impediment to such rotation of the casing 14. The flange 13, therefore, prevents the coupling 19 from binding upon the coupling member 17.

Reciprocating through the casing 14 is a stem or plunger 22 which at its lower end carries a valve 23 of any suitable description, this valve coacting with and closing against the upper end of the contracted portion 11. Normally this valve is held closed and prevents passage of water from the pipe section 10 into the casing 14. The upper end of this valve stem is formed with a transversely extending passage 24 and below this passage the stem carries a downwardly opening cap 25 which has sliding engagement over the upper end of the casing 14. Extending upward from one side of the casing 14 is a bracket 26 and pivoted in this bracket is an arm 27 which passes through the aperture 24, this arm at its middle having a widened portion 24ª which engages with the upper and lower walls of the slot or aperture 24. The arm 27, at its outer end, is deflected or twisted to form a horizontally disposed lip 29, and mounted upon a bracket 30ª extending outward from the nozzle 15, which bracket is bifurcated at its end, is a sector shaped member or rocker 30 having a projecting portion 31 extending toward the lever 27, this projecting portion being cut away at 32 to receive the lip 29. The arcuate face of the member 30 is formed with teeth 33. Embracing the sector shaped member 30 is a bifurcated arm 34 and a pivot pin 35 passes through the bracket 30ª through the bifurcated arm 34 and through the sector shaped member 30. Mounted within the bifurcated portion of the arm 34, outward of the edge face of the sector 30, is a sliding detent 36, toothed on its inner face to engage with the teeth 33 and adapted when engaged with the teeth 33, to hold the bifurcated arm 34 and the member 30 in locked adjustment. Screw threaded into the end of the arm 34 is a float rod 37, carrying at its end a float 38. This float rod can screw into the end of the arm 34 and engage with the detent 36 and force the detent into locking engagement with the sections 30. The float rod 37 is held from a rotation in a reversed direction by means of a jam nut 39 or other suitable device.

In the practical operation, assuming that the device is used in flush tanks, or under like situations, the float, when it lifts the float rod 37, will cause the depression of the lever 27, thus shifting the valve on the valve stem 22 into engagement with the upper contracted end of the pipe 10, shutting off the supply of water. When, however, the water falls below a predetermined height in the flush tank, then the reverse operation will take place, the lever 27 will lift the valve from its seat and water will enter the casing 14 and be discharged through the nozzle 15. By loosening the engagement of the detent 36 with the teeth 33, it is possible to adjust the float relative to the valve and relative to the depth of the water in the flush tank, or to suit various circumstances of operation.

Swiveling the casing 14 to the pipe 1 is of a great advantage on the water supply valves used in flush tanks, as very often the workman, in making up or repairing the joint below the tank, turns the pipe section 10 and under ordinary circumstances turns the casing and the valve stem coacting therewith. If the valve casing, stem and pipe section 10 are held rigidly together, the valve lever is liable to strike the side of the tank thus tightening the stem, breaking the joint between the pipe section and the valve casing, and otherwise damaging the device. This cannot happen, however, with the construction which I have devised for the reason that even if the float 38 and the float arm 37 strike the sides of the tank, they will simply be impeded from further movement and will not be twisted or otherwise damaged by a rotation of the pipe section 10, and, furthermore, the slight contact which the float ball will have with the side of the tank will not in any way affect the raising or lowering of the ball, and, furthermore, this permits the valve casing to be directed in any desired direction, with reference to the flush tank, without regard to the position of the supply pipe. It will be seen that the valve is operated by a very powerful leverage exerted by the float, that the construction is simple, and that it may be very readily adjusted. Furthermore, the construction provides for a valve which will close continually even against high pressure.

Having described the invention, what I claim is:

1. A valve mechanism of the character described including a pipe having an extension of reduced diameter, providing an annular shoulder at its junction with the body of the said pipe, the end of said extension forming a valve seat, a valve casing swiveled on the extension for free rotation therearound and carrying an outwardly projecting flange concentric to the extension, a nut screw-threaded on the pipe and having an inwardly projecting flange extending over the outwardly projecting flange and holding the outwardly projecting flange of the valve casing in proximity to said shoulder, means preventing the nut from binding said flange of the casing against the shoulder to thereby permit free rotation of the casing, and a valve in the casing coacting with said seat.

2. A valve mechanism of the character described, including a supply pipe section, having a flange below its upper end, a valve casing into which the upper end of the pipe section projects, a sleeve surrounding and rotatably mounted upon the upper end of the pipe section and having exterior screw-heads engaging screw-threads on the valve casing, said sleeve having an annular flange at its lower end, and a coupling having an inwardly extending annular flange on its upper end interlocking and rotatable relative to said flange on the sleeve, said coupling having screw-threaded engagement with the pipe section and bearing against the flange on the pipe section and being disposed in spaced relation to the flange on the sleeve.

3. In a valve mechanism of the character described, a pipe section having a reduced upper end, a valve casing into which the reduced upper end of the pipe section projects, a sleeve surrounding the reduced portion of the pipe section and fitting thereon and having exterior screw-threads engaging interior screw-threads on the valve casing, said sleeve having an annular flange on its lower end, and a coupling having an inwardly extending annular flange on its upper end overlapping and rotatably engaging the annular flange on the sleeve, said coupling having screw-threaded engagement with the upper end of the pipe section below the reduced portion thereof, and means limiting the inward movement of said coupling upon the pipe section and preventing binding of the coupling upon the flange of the sleeve.

In testimony whereof I hereunto affix my signature in the presence of two witnesses.

CHARLES T. MILLER.

Witnesses:
M. F. STAUB,
M. R. WILSON.

Copies of this patent may be obtained for five cents each, by addressing the "Commissioner of Patents, Washington, D. C."